(12) United States Patent
Bellmore et al.

(10) Patent No.: US 6,899,304 B2
(45) Date of Patent: May 31, 2005

(54) METHOD FOR FORMING A FASTENER

(75) Inventors: Brett Bellmore, Capac, MI (US); Matthew Macker, Almont, MI (US)

(73) Assignee: Ligon Brothers Manufacturing, Almont, MI (US)

( * ) Notice: Subject to any disclaimer, the term of this patent is extended or adjusted under 35 U.S.C. 154(b) by 18 days.

(21) Appl. No.: 10/410,795

(22) Filed: Apr. 9, 2003

(65) Prior Publication Data

US 2003/0230678 A1 Dec. 18, 2003

Related U.S. Application Data

(60) Provisional application No. 60/371,750, filed on Apr. 11, 2002.

(51) Int. Cl.[7] .................................................. F16L 3/08
(52) U.S. Cl. ........................ 248/65; 248/74.1; 248/74.2; 24/485
(58) Field of Search ........................ 248/65, 74.1, 74.2, 248/71, 489, 316.7; 24/485, 489, 531, 543

(56) References Cited

U.S. PATENT DOCUMENTS

| 4,240,604 | A | | 12/1980 | Brach ........................... 248/316 |
|---|---|---|---|---|
| 4,840,333 | A | * | 6/1989 | Nakayama ................... 248/68.1 |
| 5,263,671 | A | * | 11/1993 | Baum .......................... 248/68.1 |
| 5,277,387 | A | * | 1/1994 | Lewis et al. ................ 248/74.2 |
| 5,316,245 | A | * | 5/1994 | Ruckwardt ................... 248/68.1 |
| 5,669,590 | A | * | 9/1997 | Przewodek ................. 248/68.1 |
| 5,713,737 | A | * | 2/1998 | Sundstrom et al. .......... 433/139 |
| 5,765,787 | A | * | 6/1998 | de Beers et al. .............. 248/73 |
| 5,820,048 | A | * | 10/1998 | Shereyk et al. ............. 248/68.1 |
| 5,820,083 | A | * | 10/1998 | Geiger ....................... 248/74.3 |
| 6,364,257 | B1 | * | 4/2002 | Holder ....................... 248/74.3 |
| 6,484,365 | B1 | * | 11/2002 | Thompson ................... 24/3.12 |
| 6,561,471 | B1 | * | 5/2003 | Hawie ......................... 248/201 |
| 6,708,436 | B2 | * | 3/2004 | Nagel ...................... 40/661.01 |

OTHER PUBLICATIONS

Copending U.S. Appl. No. 10/090,683 filed Mar. 4, 2002.

* cited by examiner

*Primary Examiner*—Leslie A. Braun
*Assistant Examiner*—Steven Marsh
(74) *Attorney, Agent, or Firm*—Dobrusin & Thennisch PC

(57) ABSTRACT

The present invention provides a fastener and a method of forming the fastener. The fastener typically includes a member connected to at least one clip. Preferably, the clip includes a liner that is softer than at least one other portion of the fastener.

20 Claims, 3 Drawing Sheets

METHOD FOR FORMING A FASTENER

CLAIM OF BENEFIT OF FILING DATE

The present application claims the benefit of the filing date of U.S. Provisional Application Ser. No. 60/371,750 (filed Apr. 11, 2002), hereby incorporated by reference.

FIELD OF THE INVENTION

The present invention relates generally to a fastener and method of forming the same.

BACKGROUND OF THE INVENTION

Fasteners of various types have been formed for many years. An example of one fastener is in U.S. Pat. No. 4,240,604, which is incorporated fully herein for all purposes. The present invention provides an improved fastener and method of forming the same.

BRIEF DESCRIPTION OF THE DRAWINGS

The features and inventive aspects of the present invention will become more apparent upon reading the following detailed description, claims and drawings, of which the following is a brief description:

DETAILED DESCRIPTION OF THE INVENTION

The invention generally relates to a fastener for positioning a first member such as a hose, a cable, brake lines, computer cables or the like relative to a second member such as an automotive vehicle, a household or industrial appliance, furniture (e.g., a desk), storage containers or the like, and to a method of forming the fastener.

Figure 1:
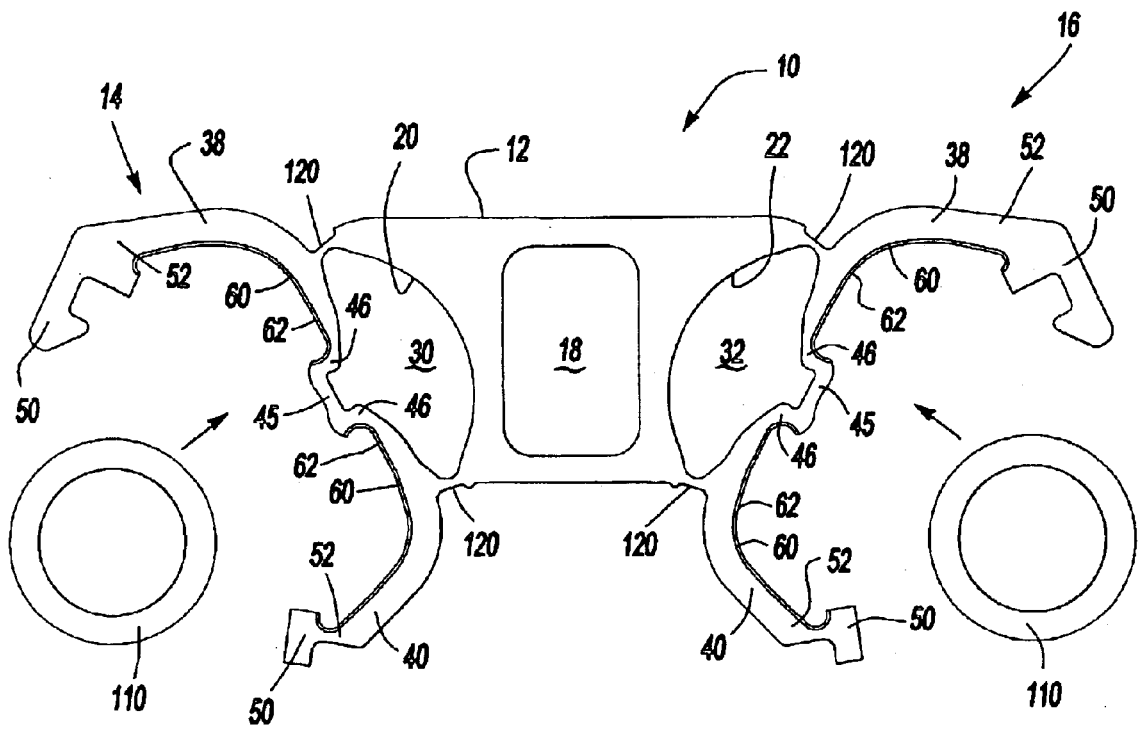
FIG. 1 is a front view of an exemplary fastener of the present invention in an unfastened condition.
Figure 2:
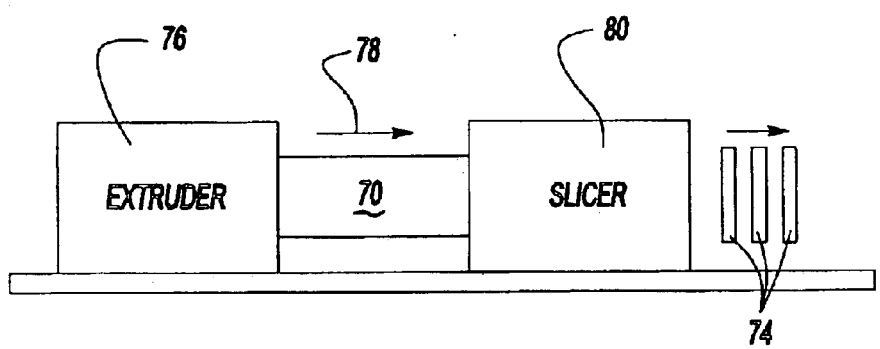
FIG. 2 is a schematic view of an exemplary method of forming a fastener according to an aspect of the present invention.
Figure 3:
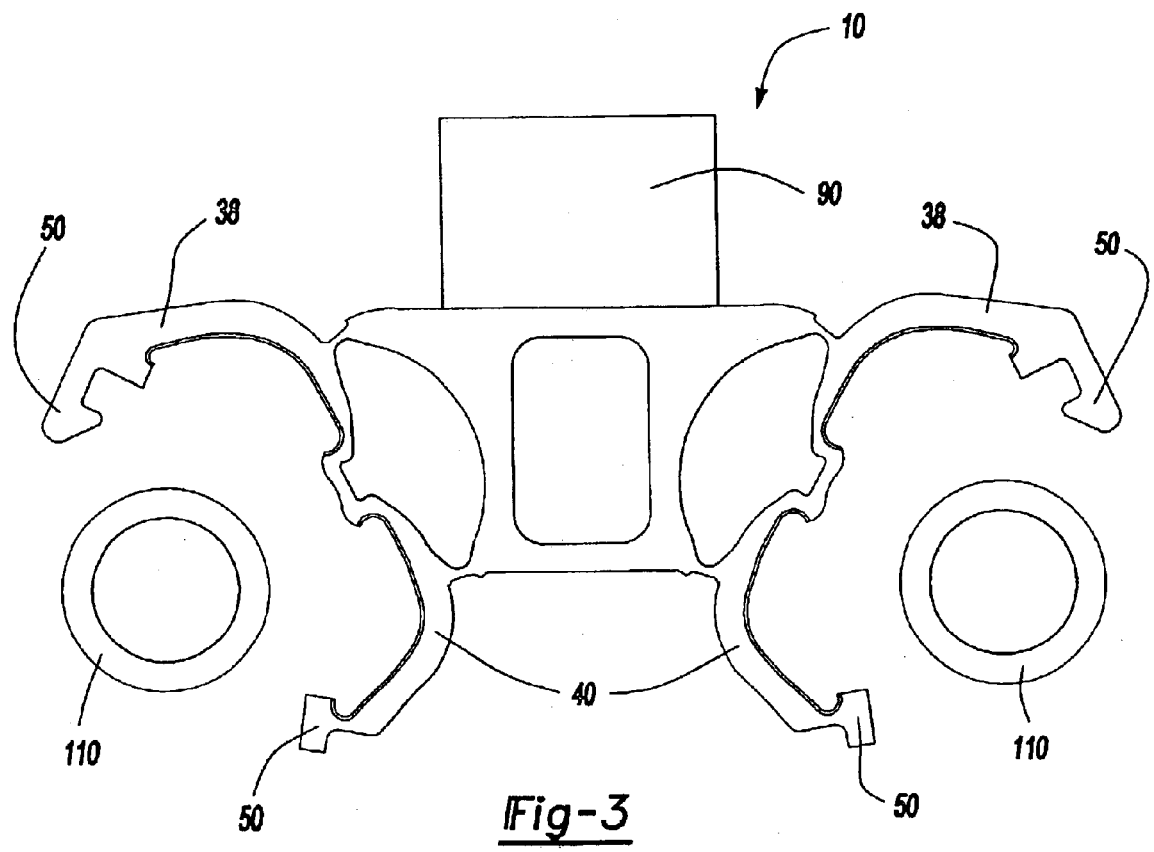
FIG. 3 is a front view of the fastener of FIG. 1 attached to a component.

Referring to FIGS. 1–3, there is illustrated an exemplary embodiment of a fastener 10 comprised of a member 12 connected to a pair of clips 14, 16. The member 12 may be formed in a variety of shapes and configurations. In the illustrative embodiment shown, the member 12 is generally skeletal and has a through-hole 18 extending therethrough. Of course the member 12 could be substantially continuous, however, the skeletal nature of the member 12 tends to lower its weight and utilizes less material to form. In the example shown, the member 12 includes a first concave surface 20 and a second concave arcuate surface 22, each of the surfaces 20, 22 defining channels 30, 32 in the member 12. As shown, the surfaces 20, 22 are generally arcuate, however, it is contemplated that the surfaces may be formed in a variety of configuration to form the channels 30, 32 in a desired shape.

Each of the clips 14, 16 is preferably comprised of a first member 38 hingedly connected to a second member 40. As shown, the first member 38 and second member 40 of each of the clips 14, 16 are generally arcuate although they may be other shapes as well such as angled or otherwise. Preferably the first member 38 is hingedly connected to the second member 40 via a hinge portion 45 at a proximate end 46 of each of the members 38, 40. It is also preferable for a mating portion 50 to be located at a distal end 52 of each of the members 38, 40. Additionally, each of the members 38, 40 preferably includes a liner 60 for providing a generally softer contact surface 62. As shown, the liner 60 is a layer positioned upon an inner portion of each of the members.

In the preferred embodiment shown, the fastener 10 includes a pair of clips connect by a member that acts as web therebetween. In alternative embodiments however, it is contemplated that the fastener may have only one clip or may have 3, 4, 5 or more clips. Moreover two or more clips may be attached directly to each other only or in addition to being connected with another member.

Manufacture

It is contemplated that various different methods might be used for forming fasteners in configurations disclosed herein. Exemplary of those methods are molding techniques, casting techniques or the like. In preferred embodiments, however, the fasteners of the present invention are at least partially formed by extrusion.

According to one preferred embodiment, and referring to FIGS. 1 and 2, the fastener 10 is formed by extrusion of one or more plastic or polymeric materials into a mass 70 followed by slicing the mass 70 into slices 74 to form fasteners. For extruding, it is preferable for the mass 70 to have a continuous cross-section as it exits an extruder 76 wherein the cross-section is preferably substantially perpendicular to an extrudate direction 78 (i.e., a direction of emission of the mass 70 out of the extruder 76). Such a continuous cross-section allows a slicer 80 (i.e., which may be any number of different cutting apparatuses) to cut the mass 70 along the cross-section into substantially similar or identical slices 74. Preferably, the slices 74 are in the configuration of the fastener (e.g., such as the fastener 10 of FIG. 1) directly after slicing and without having to further shape or otherwise process the slices 74 to form the fastener. Of course, it is contemplated that further shaping steps may taken as desired. It is also contemplated that various extruding techniques may be used to vary the cross-section of the mass 70 and therefore the fasteners formed from the mass 70 such as by using dynamically changing dies that change as the mass 70 is extruded.

In a highly preferred embodiment, the fastener of the present invention is co-extruded to form the fastener as a composite with one or more contacting surfaces or layers. Accordingly, the fastener 10 shown in FIG. 1 may be formed by co-extrusion to have its liners 60 wherein the liners 60 are formed of a generally softer material than the rest of the fastener 10. It is also contemplated that either the liners 60 or the main portion or body of the fastener 10 may be extruded while the other may be formed according to other techniques.

Fasteners formed according to the present invention may be formed of a variety of materials such as metal, plastic, polymeric materials, combinations thereof or the like. According to one preferred embodiment, the fastener is formed entirely or substantially entirely of a singular rigid or semi-rigid thermoplastic material. In the preferred embodiment of FIG. 1, the entire fastener 10 is formed of a rigid or semi-rigid thermoplastic with the only exception being the liners 60, which preferably are elastomeric or include an elastomeric component. Examples of suitable thermoplastic materials include, but are not limited to, polyamides, polyolefins, polyethylene, polyvinyl chlorides, polypropylene, combinations thereof or the like which may include fillers such as clay, talc or the like. Examples of suitable elastomers for the liners 60 include rubber, latex or the like. In one preferred embodiment, the liners 60 are formed of a thermoplastic/elastomer mixture (e.g., a thermoplastic having a rubber phase mixed in) such as a thermoplastic vulcanite. One exemplary material is thermoplastic elastomer sold under the tradename SANTOPRENE, commercially available from Advanced Elastomer Systems, 388 S. Main Street, Akron, Ohio, 44311-1059.

Operation

In operation, fasteners of the present invention are generally used to connect one member to another member. Preferably, the clips of the fasteners are used to connect one or more tubular or elongated members to another member of an article of manufacture. Exemplary tubular or elongated members include, amongst others, cables, conduits, hoses, brake lines, wires, wire harnesses, electrical connections or the like.

Figure 4:
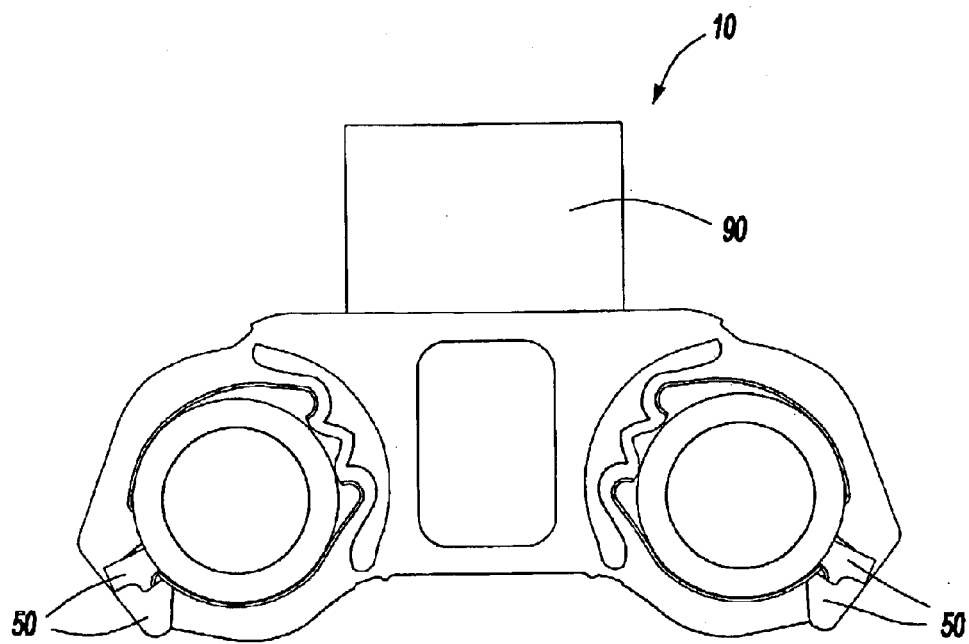
FIG. 4 is a front view of the fastener of FIG. 1 in a fastened condition.
Figure 5:
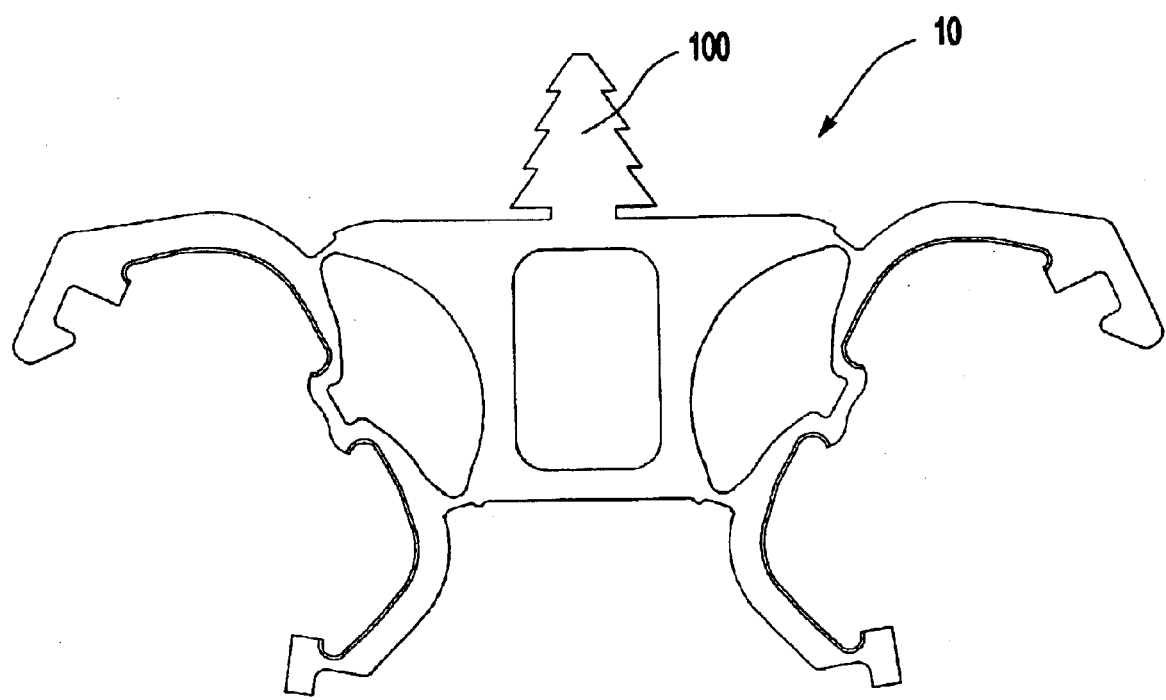
FIG. 5 is a front view of another exemplary fastener of the present invention.

Referring to FIGS. 3 and 4, the fastener 10 is shown attached to a member 90. The member 90 may be a portion of a number of articles of manufacture such as an automotive vehicle, furniture, a building, a structure or the like. Moreover, the fastener 10 may be attached to the member 90 according to a variety of techniques. The fastener 10 may be taped to the member 90, adhesively secured to the member 90 or the like. Preferably, the fastener includes a fastening member suitable for attachment to a member of an article of manufacture. As an example, FIG. 5 illustrates the fastener 10 of FIG. 1 and 3–4 with a fastening member 100 in the general shape of a Christmas tree (e.g., with flange portions) wherein the fastening member 100 may be inserted into an opening of a member of an article of manufacture to create an interference fit with the article thereby attaching the fastener 10 to the article.

Another exemplary fastening member and method of forming the fastening member is disclosed in a commonly owned patent application Ser. No. 10/090,683, titled "Polymer Component Apparatus and Method", filed on Mar. 4, 2002 and fully incorporated herein by reference for all purposes. More particularly, according to the method of the above reference, an exemplary fastening member is formed by locally heating and softening or melting a portion of the member 12 or the clips 14, 16 of the fastener 10. Thereafter or simultaneously, the locally heated portion is compressed between a pressing unit (e.g., a cylindrical die) and a die cavity such that the fastening member forms in the shape of the pressing unit, the cavity or both. Upon allowing the portion to cool, while in the die cavity or outside the cavity, the portion preferably solidifies thereby hardening the fastening member according to the shape that is was formed in the cavity.

In FIGS. 1 and 3, the clips 14, 16 of the fastener 10 are in an open position for receiving a pair of members 110, which happen to be tubular. In the preferred embodiment shown, the clips 14 and 16 are over center type clips. Thus, upon insertion of the member 110 into the clips 14, 16, the first and second members 38 and 40 are rotated about the hinged portions 45 of the clips 14, 16 as connections 120 that connect the center member 12 to the clips 14, 16 flex away from hinge portions 45. Then as the hinge portions 45 enter the channels 30, 32, the flexed connections 120, bias the ends 46 of the members 38 and 40 and the hinge portions 45 of the clips 14, 16 toward the arcuate surfaces 62. Thus, the clips 14, 16 are closed about the members 110 securing the members 110 therein. Preferably, the mating portions 50 of the members 38, 40 may be snap-fit together (e.g., as shown in FIG. 4) for substantially surrounding and securing the members 110.

Advantageously, the liners 60 or the surfaces 62 of the liners 60 are substantially the only portions of the clips 14, 16 that contact the member 110 secured therein. In turn, the clips 14, 16 are less likely to damage the members 110 due to the relative softness or buffering properties of the liners 60.

In the embodiment shown, the clips 14, 16 are generally annular when they the mating portion 50 are secured together. However, it is contemplated that various alternative configurations (e.g., square, rectangular or otherwise) for the clips 14, 16 may be formed as well depending upon the members (e.g., elongated members) to be secured in the clips.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A method of forming one or more fasteners, the method comprising:

providing a first material and a second material, the first material different from the second material;

co-extruding the first material and the second material to form a mass: and slicing the mass to form at least one fastener having a plastic member and a first clip attached to the plastic member, wherein:

i) the first clip includes a first member hingedly connected to a second member with a first hinge portion at a proximate end of each of the first member and the second member;

ii) the first member and second member are at least partially formed of the first material; and iii) each of the first member and the second member include an inner liner formed of the second material for providing a softer contact surface, the first member is connected to the plastic member with a $2^{nd}$ hinge portion; and the $2^{nd}$ member is connected to the plastic member with a $3^{rd}$ hinge portion.

2. A method as in claim 1, further comprising:

locally heating and melting a portion of a plastic member to form a molten zone;

compressing the portion of the plastic member between a pressing unit and a die cavity for shaping a fastening member as a part of the fastener; and solidifying the portion thereby hardening the fastening member.

3. A method as in claim 1, wherein the second material is at least partially formed of an elastomer.

4. A method as in claim 1, wherein the first material is at least partially formed of a thermoplastic material selected from the group of polyamides, polyolefins, polyethylene or polyvinyl chloride and wherein the inner liner is formed a thermoplastic vulcanite.

5. A method as in claim 1 wherein the inner liner is integrally formed with the first member and second member of the clip during the co-extrusion step.

6. A method as in claim 1 wherein the mass has a substantially continuous cross-section perpendicular to a direction of emission of the mass from an extruder.

7. A method as in claim 1 wherein the cross-section of the mass varies during extrusion.

8. A method as in claim 1 wherein the fastener is in its desired configuration upon slicing without having to further shape or other process the fastener.

9. A method as in claim 1 wherein the inner liners of the first member and the second member are integral with the first member and the second member such that the inner liners rotate with the first member and the second member during opening and closing of the first clip.

10. A method as in claim 1 wherein the inner liners are substantially coextensive with the first and second members.

11. A method of forming one or more fasteners, the method comprising:
  providing a first material and a second material, the first material different from the second material, the first material at least partially formed of a thermoplastic;
  co-extruding the first material and the second material to form a mass; and
  slicing the mass to form at least one fastener having a skeletal plastic member and a first clip and a second clip integrally formed with the plastic member, wherein:
  i) the first clip and the second clip each include a first member hingedly connected to a second member with a hinge portion at a proximate end of each of the first member and the second member;
  ii) each of the first members and the second members are formed of the first material and each of the first members and second members include a distal end; and
  iii) each first member and each second member of the first and second dips include an inner liner formed of the second material for providing a softer contact surface;
  iv) the plastic member includes a first concave surface forming a first channel and a second concave surface forming a second channel;
  v) the hinge portion of the first clip and hinge portion of the second clip are respectively biased toward the first concave surface and the second concave surface upon movement of the distal end of the first member toward the distal end of the second member for each of the first and second clips; and
  vi) the inner liners are integrally formed with the first member and second member during the co-extrusion step.

12. A method as in claim 11, further comprising:
  locally heating and melting a portion of a plastic member to form a molten zone;
  compressing the portion of the plastic member between a pressing unit and a die cavity for shaping a the fastening member as a cart of the fastener; and
  solidifying the portion thereby hardening the fastening member.

13. A method as in claim 11 wherein the first material is at least partially formed of a thermoplastic material selected from the group of polyamides, polyolefins, polyethylene or polyvinyl chloride and wherein the inner liner is formed a thermoplastic vulcanite.

14. A method as in claim 11, wherein the cross-section of the mass is substantially constant during extrusion.

15. A method as in claim 11 wherein, upon movement of the distal end of the first member toward the distal end of the second member for each of the first and second clips, the clips form a configuration that is selected from substantially rectangular, substantially square or substantially annular.

16. A method as in claim 11 wherein the mass has a substantially continuous cross-section perpendicular to a direction of emission of the mass from an extruder and wherein the fastener is in its desired configuration upon slicing without having to further shape or other process the fastener.

17. A method as in claim 11 wherein the cross-section of the mass varies during extrusion.

18. A method as in claim 11 wherein the inner liners of the first member and the second member are integral with the first member and the second member such that the inner liners rotate with the first member and the second member during opening and closing of the first clip.

19. A method as in claim 11 wherein the inner liners are substantially coextensive with the first and second members.

20. A method of forming one or more fasteners, the method comprising:
  providing a first material and a second material, the first material different from the second material, the first material at least partially formed of a thermoplastic selected from the group of polyamides, polyolefins, polyethylene or polyvinyl chloride, the second material at least partially formed of a thermoplastic vulcanite;
  co-extruding a first material and a second material to form a mass wherein the mass has a substantially continuous cross-section perpendicular to a direction of emission of the mass from an extruder; and
  slicing the mass to form a plurality of fasteners, each of the fasteners having a skeletal plastic member and a first clip and a second clip integrally formed with the plastic member, wherein for each of the plurality of fasteners:
  i) the first clip and the second clip each include a first arcuate member hingedly connected to a second arcuate member with a hinge portion at a proximate end of each of the first member and the second member;
  ii) each of the first members and the second members are formed of the first material and each of the first members and second members include a distal end;
  iii) each of the first arcuate member and the second arcuate member include a mating portion located at a distal end of each of the first arcuate member and the second arcuate member
  iv) each first member and each second member of the first and second clips include an inner liner formed of the second material for providing a softer contact surface;
  v) the plastic member includes a first arcuate concave surface forming a first channel and a second arcuate concave surface forming a second channel;
  vi) the hinge portion of the first clip and hinge portion of the second clip are respectively biased toward the first concave surface and the second concave surface upon movement of the distal end of the first member toward the distal end of the second member for each of the first and second clips; and vii) the inner liners are integrally formed with the first member and second member during the co-extrusion step;

viii) the plastic member has a through-hole extending therethrough;

ix) the inner liners of the first members and the second members are integral with the first members and the second members such that the inner liners rotate with the first members and the second members during opening and closing of the first clip;

x) the fastener is in its desired configuration upon slicing without having to further shape or other process the fastener; and xi) the inner liners are substantially coextensive with the first and second members.

* * * * *

UNITED STATES PATENT AND TRADEMARK OFFICE
CERTIFICATE OF CORRECTION

PATENT NO. : 6,899,304 B2
DATED : May 31, 2005
INVENTOR(S) : Bellmore et al.

It is certified that error appears in the above-identified patent and that said Letters Patent is hereby corrected as shown below:

Column 4,
Line 58, replace "," with -- ; --.

Column 5,
Line 47, replace "dips" with -- clips --.
Line 66, omit the word "the".
Line 67, replace "cart" with -- part --.

Signed and Sealed this

Twenty-second Day of November, 2005

JON W. DUDAS
*Director of the United States Patent and Trademark Office*